Patented Nov. 20, 1923.

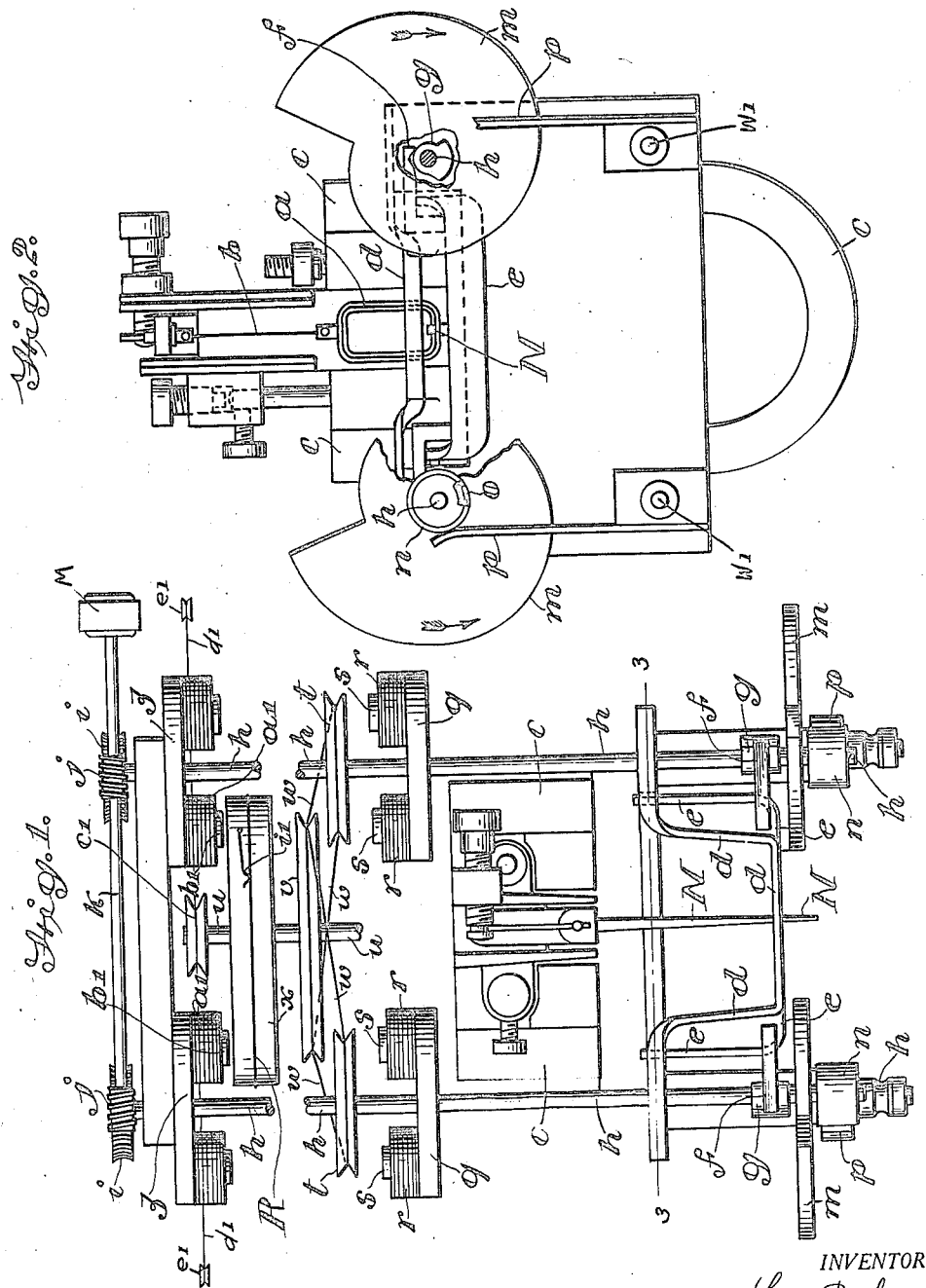

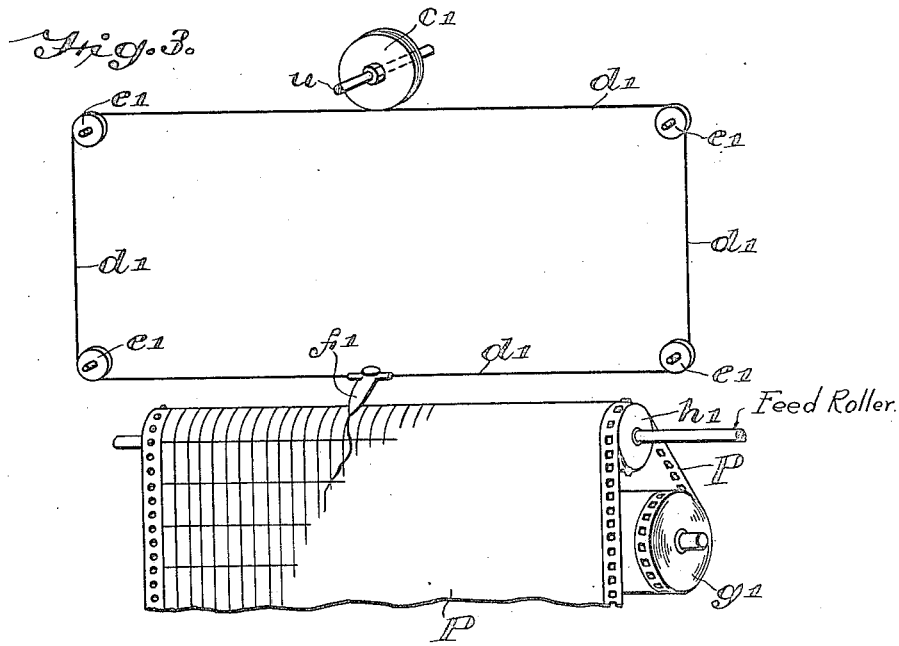
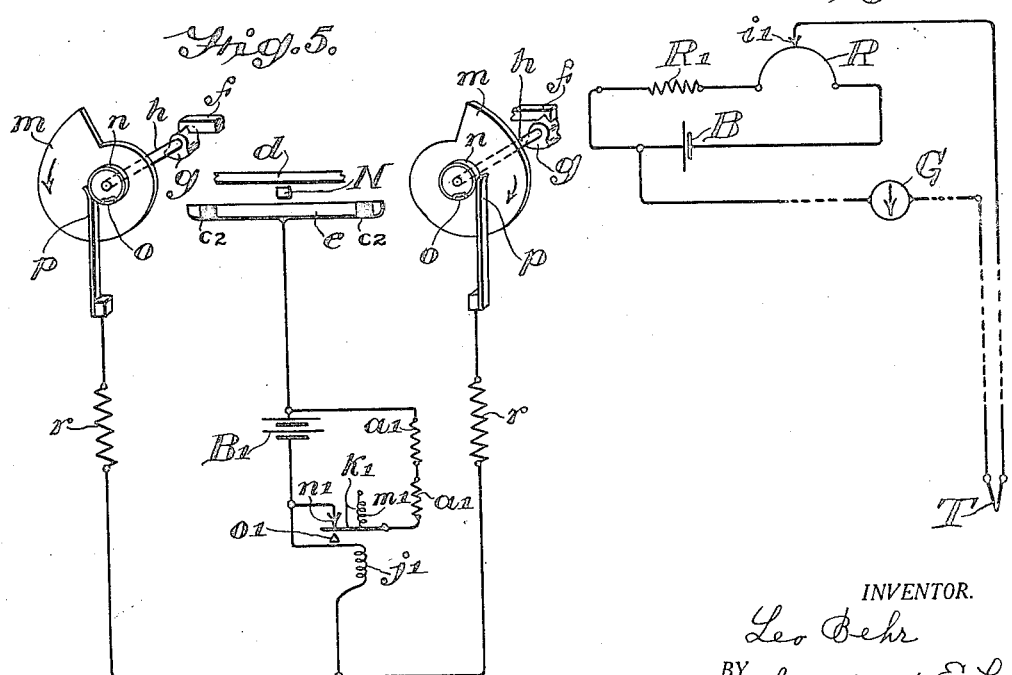

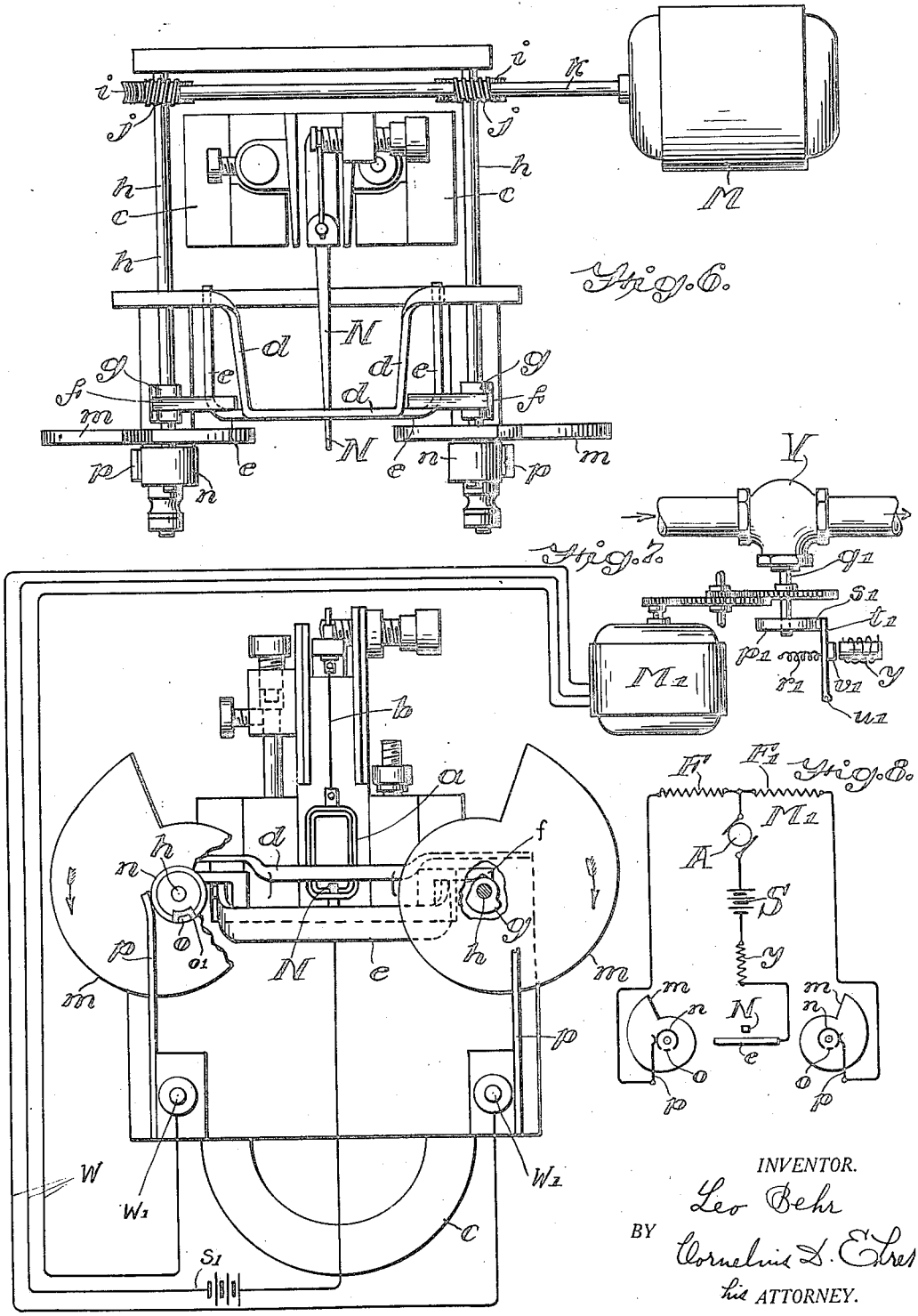

1,474,884

UNITED STATES PATENT OFFICE.

LEO BEHR, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

AUTOMATIC CONTROL APPARATUS.

Application filed November 12, 1920. Serial No. 423,724.

*To all whom it may concern:*

Be it known that I, LEO BEHR, a citizen of the United States, residing in the city and county of Philadelphia, State of Pennsylvania, have invented new and useful Improvements in Automatic Control Apparatus, of which the following is a specification.

My invention relates to apparatus, responsive to variations in a condition, as of temperature, pressure, etc., or variations in current, electro-motive-force or other electrical condition, for automatically effecting any suitable or desirable control, as control or actuation of a marker, as in a recorder, of a valve for controlling fuel or other fluid, a rheostat or other electrical device for influencing or controlling an electric circuit, and the like.

My invention resides in apparatus of the character referred to wherein there is employed as a control element the deflecting needle or pointer of any deflecting instrument, as of a pressure or other gauge, galvanometer or the like, co-acting with means offering suitable resistance to its movement, as it returns to normal or zero position, and co-acting further with any suitable means, as a cam, for effecting its said movement, an electric circuit being established for the duration of its said movement, whereby an electrical control is effected whose duration depends upon the time required for effecting the movement of the needle or pointer, as in returning it to zero or normal position, the means resisting said movement serving to effect suitably stable or perfect electrical contact for control purposes.

My invention resides further in apparatus of the character above referred to in which means are provided for periodically offering to the deflected pointer or needle the aforesaid resistance to its movement, as it is returned to its normal or zero position.

My invention resides further in apparatus of the character referred to in which means are provided for interrupting the control circuit independently of the needle or pointer just before or substantially at the time the needle or pointer has been returned to zero or normal position or otherwise reached its limit of movement.

My invention resides further in apparatus of the character referred to wherein the circuit or circuits controlled by the pointer or needle control coupling between a source of power and a movable structure, the movable structure being employed for moving a marker or recorder, for operating a valve, or for moving any other member or structure for any suitable or desired purpose.

My invention resides in apparatus of the character hereinafter described and claimed.

For an illustration of some of the various forms my invention may take, reference is to be had to the accompanying drawings, in which:

Fig. 1 is an exploded plan view of apparatus embodying my invention.

Fig. 2 is a front elevational view of parts shown in Fig. 1.

Fig. 3 is a fragmentary perspective view illustrating recorder mechanism controlled or actuated by the apparatus of Figs. 1 and 2.

Fig. 4 is a diagrammatic view of an example of a potentiometer control circuit for the galvanometer.

Fig. 5 is a diagrammatic view of the circuits controlled by the galvanometer.

Fig. 6 is a plan view of a modified form of apparatus.

Fig. 7 is in part a front elevational view of apparatus shown in Fig. 6 and of circuits and apparatus controlled thereby.

Fig. 8 is a diagram of circuits of Fig. 7.

Referring to Figs. 1 and 2, N represents the needle or pointer of any deflecting device or instrument, as of a pressure or other gauge, galvanometer, etc. In the example illustrated, N is the needle or pointer of a galvanometer G, Fig. 4, attached to the movable system or coil $a$ thereof, the coil $a$ being suspended and electrically connected in circuit by the usual suspension wires $b$, as well understood in the art. The coil $a$ is disposed in the field of any suitable magnet, as for example, the permanent magnet $c$.

The needle N is disposed in a gap between the clamping or friction members $d$ and $e$, both pivoted at their ends by suitable horizontal pivots (not shown) and capable, therefore, of rotation about an axis 3—3 (Fig. 1). The member $d$ yields upwardly slightly when the member $e$ is raised against the under side of the needle N, the members $d$ and $e$ exerting on needle N a suitable frictional or opposing force to retard the return movement of the needle N.

On each end of the member $e$ is a cam follower $f$ co-acting with a cam $g$. The cams $g$, $g$ are driven by the continuously rotating shafts $h$, $h$, upon which are secured the worm gears $i$, $i$ driven in opposite directions by the worms $j$, $j$ secured upon the shaft $k$, continuously rotated by any source of power, as an electric motor, clockwork or the like.

Secured upon the shafts $h$, $h$ are the cams $m$, $m$, rotating in opposite directions and each adapted to engage the side of the pointer or needle N to return it to or toward its mid or zero position indicated, the throw or difference between maximum and minimum radius of the cam being preferably suitable for such extended movement of the needle N. Carried by each of the shafts $h$ are the long and short commutator segments $n$ and $o$, of which $o$ is entirely insulated from the apparatus by means of interposed insulating material $o^1$, while $n$ is in electrical communication, through the shaft $h$, with the associated cam $m$. Bearing upon each commutator is a brush $p$. The brushes $p$ are provided with terminals $W^1$ that may be connected to a circuit W as shown in Fig. 7.

Secured upon each of the shafts $h$ and rotating therewith is a clutch magnet structure $q$ comprising one or more electromagnet windings $r$, $r$ for magnetizing the soft iron poles $s$. To serve as the armature for each of the clutch magnets, there is provided the pulley or wheel $t$ of soft iron or other magnetizable material, each wheel or pulley $t$ being concentric with the shaft $h$ but loose thereon. Attached to a fixed member $z$ are electromagnet windings $a^1$ employed to excite the soft iron poles $b_1$, said poles being located sufficiently close to the soft iron pulley $t$ to be in operative relation therewith. A driven shaft $u$ has secured thereon the pulley or wheel $v$ adapted to be driven by either of the pulleys $t$ through the cords or belts $w$ or any other suitable driving means. The wheel $v$ and parts movable therewith constitute a movable structure controlled by the galvanometer and actuated by any suitable source of power, as the source of power which drives the shaft $k$ and shafts $h$. Secured upon the shaft $u$ is a disk or wheel $x$, on which may be carried the slide wire R.

Secured upon the shaft $u$ is a pulley or wheel $c^1$ which, as indicated in Fig. 3, is adapted to drive through cord $d^1$, passing over idler pulleys $e^1$, the pen or marker $f^1$ of recorder mechanism, the marker $f^1$ being moved automatically transversely of the recorder paper P, which may be stored upon a roll $g^1$ and continuously unrolled therefrom at uniform speed by the roller $h^1$ driven by any suitable source of power as for example, by suitably gearing to the shaft $k$, Fig. 1.

The galvanometer may be associated with any electrical circuit in which a change of current, electro-motive-force or other electrical factor is the change in a condition to be recorded or to effect a control, or which may be representative of change in any condition, as of pressure, temperature, etc.

In the example illustrated in Fig. 4, the galvanometer is associated with a potentiometer circuit comprising the source of current or battery B connected in series with the slide wire resistance R, which, as indicated in Fig. 1, may rotate with the disk $x$, and the resistance $R^1$. A thermo-couple T, which may be subjected to the temperature whose changes are to effect the control, is connected, on the one hand, to the brush or sliding contact $i^1$ that may be secured to a fixed support (not shown) and along which the resistance R may be moved, and, on the other hand, through the galvanometer G to another point in the circuit of the resistance R.

While a potentiometer circuit has been described, and a thermo-couple referred to, it will be understood that any other type of circuit, as a simple circuit, or any other balancing circuit, as a Wheatstone bridge, may be employed, and any other device employed in lieu of the thermo-couple T.

Referring to Fig. 5, $B^1$ is a source of current or battery whose one terminal is connected to the aforesaid movable or clamping member $e$ which is suitably insulated, as by its section $e^2$, or otherwise, from the metallic or conducting parts of the apparatus. The other terminal of the source $B^1$ connects with one terminal of the coil $j^1$ of a relay whose armature $k^1$ is normally held retracted by spring $m^1$ against the contact $n^1$, but which upon energization of the coil $j^1$ will be attracted away from contact $n^1$ and limited in its movement by stop $o^1$. The other terminal of the relay coil $j^1$ connects through the clutch magnet windings $r$, $r$ with the brushes $p$, $p$, which, when in contact with the segments $n$, $n$, are in electrical communication with the conducting cams $m$, $m$.

A circuit through the apparatus of Fig. 5 is established upon the engagement of the member $e$ with the pointer N, the engagement of one of the cams $m$ and the pointer N, and the engagement of the segmental contact member $n$ with the finger $p$, as hereinafter set forth in detail.

The operation is as follows:

With the shafts $h, h$ continuously revolving at suitable speed, the cams $g, g$ periodically lift their followers $f, f$, thereby periodically lifting the friction or clamping member $e$ into engagement with the under side of the needle or pointer N, raising it into engagement with the complementary friction or clamping member $d$, which yields upon its pivots, whereby the needle N is periodically clamped between the members $d$ and $e$, but not sufficiently tightly to prevent the movement of needle N between them when actuated by either cam $m$.

As is well-known in the arts, the measurement of temperature by means of a thermocouple and potentiometer is accomplished by moving R with respect to $i_1$ to such a position that there is no electric current flowing through the galvanometer G as indicated by the needle N of said galvanometer being at its zero position. With a change in temperature affecting the thermocouple T, the electromotive force produced thereby will change, causing a corresponding flow of current through the galvanometer G and a corresponding deflection of the needle N.

Assuming the galvanometer needle N to deflect toward the right, Figs. 1, 2 and 5, it will, when deflected, be clamped between the members $d$ and $e$, and will remain so clamped while the cam $m$ rotates and forces the needle N toward the left, in opposition to the friction between it and the members $d$ and $e$. This friction is preferably not excessive, but sufficient to cause firm and perfect electrical contact between the surface of the cam $m$ and the side of the needle N and between needle N and member $e$.

By this means the light or delicate needle of a relatively delicate instrument may be employed to effect a sufficiently good and perfect electrical contact to control a relatively large current, the firmness or perfection of contact being independent of the magnitude of torque of the moving coil $a$ or other moving system which deflects the needle N.

In so restoring needle N from right toward the left after its deflection toward the right, as assumed, the circuit through the relay coil $j^1$, right hand clutch magnet coil $r$, brush $p$, commutator contact $n$, cam $m$, needle N, and member $e$, is not only closed, but remains closed for a period of time which is dependent upon the extent of deflection of the needle N, and therefore upon the extent of change of the condition, as of temperature. The relay is accordingly energized, breaking the circuit of the brake magnet windings $a^1, a^1$, while the right hand clutch magnet is energized, attracting to its poles $s$ the wheel or pulley $t$, which accordingly then rotates with the shaft $h$, and in so doing rotates the shaft $u$ and the disk $x$ and the pulley $c^1$, which latter moves the marker $f^1$ transversely of the paper P a distance corresponding with the change in the condition, as temperature.

When the needle N has been so moved by the cam $m$ to or substantially to its mid or zero position, the long commutator contact $n$ will have been separated from the brush $p$, which will then bear upon the short insulated segment $o$, so interrupting the circuit, the arc or spark incident to circuit rupture being thereby localized at the commutator, and the immediately thereafter occurring separation between needle N and cam $m$ occurring without sparking or arcing, because the circuit is already open. This action interrupts the circuit through the coils $r$ and $j^1$, whereby the right hand wheel $t$, Fig. 1, will be no longer driven by the shaft $h$, but armature $k^1$, having returned into engagement with contact $n^1$, will re-energize the windings $a^1, a^1$ of the brake magnets $z, z$, (actually located in operative relation to grooved pulleys $t, t$) with the result that the pulleys $t, t$ will be attracted thereby and so hold them and disk $x$ from further rotation or displacement.

As the disk $x$ is rotated, as described, the slide wire R is moved with respect to the fixed brush or contact $i^1$, and in such direction as to re-balance or tend to re-balance the control or potentiometer circuit.

The result is that the apparatus operates automatically to move the marker in proportion to the extent of change to be recorded, it being understood that when the change is in opposite sense from that above assumed, the needle N will deflect towards the left, in which case the same cycles of operation will be effected, except that in such case the left hand clutch magnets will be involved and the disk $x$ rotated in opposite sense, and the marker $f^1$ moved in opposite direction.

In Figs. 6, 7 and 8, an arrangement in general similar to that hereinbefore described is illustrated for controlling either by itself or in association with the recorder mechanism of Figs. 1 to 3 inclusive, any suitable apparatus, as valve structure, electric circuit controlling means as switches, rheostats, etc., and in general any power actuated device.

As indicated in Fig. 6, an electric or other motor M rotates the shaft $k$, which through the worms $j, j$ and gears $i, i$, rotate the shafts $h, h$ in opposite directions for operating the cams $m, m$ as hereinbefore described.

As indicated in Fig. 7, the member $q^1$ is any member or device to be actuated under the control of the galvanometer and its needle N. The member $q^1$ may actuate or control the valve V, or any other means. The member $q^1$ is actuated by the electric or other motor $M^1$ whose armature A is connected by the automatic apparatus in series with either of the field windings F or $F^1$, any suitable source of current, as $s^1$, supplying the electric energy to the motor $M^1$ through the wires W. The armature A is connected to the source $s^1$ and through the same with the movable friction or clamping member $e$, which co-acts with the needle N and the latter with the cams $m$, $m$ as hereinbefore described, the left cam $m$ when in engagement with the needle N energizing the armature A and the series field F; and the right cam $m$ when in engagement with the needle N energizing the motor $M^1$ through the field winding $F^1$. Accordingly, the motor $M^1$ will rotate in the one direction or the other, since the fields F and $F^1$ are so wound or connected as to produce magnetic fields in opposite direction in which the armature A rotates. And the duration of energization of the motor $M^1$ depends upon the duration of contact between a cam $m$ and the needle N, which in turn depends upon extent of deflection of the needle N and therefore upon the extent of change to which the galvanometer G, Fig. 4, or any equivalent arrangement, as Wheatstone bridge or the like, is directly or indirectly responsive, increase in magnitude of the condition causing operation of the member $q^1$ in one direction, while decrease in magnitude of the condition causes actuation of member $q^1$ in reverse or opposite direction.

There may be applied to the controlled or driven member $q^1$ a brake for stopping it and holding it at rest immediately the motor $M^1$ is deenergized. This brake may comprise a brake wheel $p^1$ against which is normally held by spring $r^1$ the brake shoe $s^1$ carried by the lever $t^1$ pivoted at $u^1$ and carrying the armature $v^1$ with which co-acts an electro-magnet whose winding is $y$.

The winding $y$, as indicated in Fig. 8, is in circuit with the motor armature A and is simultaneously energized and deenergized therewith. When the motor $M^1$ is energized the electro-magnet $y$ lifts the brake shoe $s^1$ from the brake wheel $p^1$ and the motor actuates the member $q^1$. Immediately upon deenergization of the motor $M^1$ the winding $y$ is also deenergized and the spring $r^1$ returns the brake shoe $s^1$ into engagement with the wheel $p^1$, bringing it immediately to rest and holding it at rest.

In this arrangement the disk $x$ carrying the slide wire R, as indicated in Fig. 1, may be omitted. Instead, both the slide wire R, or equivalent, and the brush or contact $i^1$ may be stationary, the contact $i^1$ being adjusted at will to any position corresponding to any predetermined or desired magnitude of the condition involved, and the apparatus will then automatically actuate the valve V, or any other means, to maintain such condition, as temperature or the like, at such predetermined magnitude.

What I claim is:

1. Control apparatus comprising a deflecting member, a movable structure, a source of power for actuating the same, and means controlling coaction between said source of power and said movable structure comprising a member engaging said deflecting member with resultant relative movement between them for a period corresponding with the extent of deflection of said deflecting member with a pressure greater than the pressure of contact due to the force causing deflection of said deflecting member.

2. Control apparatus comprising a deflecting member, a movable structure, a source of power for actuating the same, and means controlling coaction between said source of power and said movable structure comprising a member engaging said deflecting member and moving it, and means opposing movement of said deflecting member by said member whereby the pressure of contact between them is greater than the pressure of contact due to the force causing deflection of said deflecting member.

3. Control apparatus comprising a deflecting member, a movable structure, a source of power for actuating the same, and means controlling coaction between said source of power and said movable structure comprising a member frictionally engaging said deflecting member, and means for moving said deflecting member in opposition to the friction between it and the member engaging it.

4. Control apparatus comprising a deflecting member, a movable structure, a source of power for actuating the same, and means controlling said source of power comprising a member frictionally engaging said deflecting member, and means for moving said deflecting member an extent dependent upon the extent of its deflection in opposition to the friction between it and the member engaging it.

5. Control apparatus comprising a deflecting member, a movable structure, a source of power for actuating the same, and means controlling said source of power and the duration of its effect upon said movable structure comprising a member frictionally engaging said deflecting member, means for moving said deflecting member in opposition to the friction between it and the member engaging it, and a circuit controlled by said deflecting member and controlling actuation of said movable structure by said source of power, the duration of control by said circuit depending upon the time required by said member for moving said deflecting member.

6. Control apparatus comprising a deflecting member, a movable structure, a source of power for actuating the same, and means controlling coaction between said source of power and said movable structure comprising a member engaging said deflecting member with resultant relative movement between them for a period corresponding with the extent of deflection of said deflecting member with a pressure greater than the pressure of contact due to the force causing deflection of said deflecting member, and a marker moved by said movable structure.

7. Control apparatus comprising a deflecting member, a movable structure, a source of power for actuating the same, and means controlling coaction between said source of power and said movable structure comprising a member engaging said deflecting member and moving it, means opposing movement of said deflecting member by said member whereby the pressure of contact between them is greater than the pressure of contact due to the force causing deflection of said deflecting member, and a marker moved by said movable structure.

8. Control apparatus comprising a deflecting member, a movable structure, an electric motor for actuating the same, and means controlling duration of actuation of said movable structure by said motor comprising a member engaging said deflecting member with resultant relative movement between them for a period corresponding with the extent of deflection of said deflecting member, a circuit of said motor controlled by the contact between said deflecting member and said member engaging the same.

9. Control apparatus comprising a deflecting member, a movable structure, an electric motor for actuating the same, and means controlling duration of actuation of said movable structure by said motor comprising a member engaging said deflecting member and moving it, means opposing movement of said deflecting member by said member engaging it, and a circuit of said motor controlled by the contact between said deflecting member and said member moving it.

10. The combination with the deflecting member of a galvanometer, of a member engaging the same when deflected, and a member returning said deflecting member towards normal position while in engagement with said second named member.

11. The combination with the deflecting member of a galvanometer, of a member engaging the same when deflected, a member returning said deflecting member towards normal position while in engagement with said second named member, and a circuit controlled for the duration of movement of said deflecting member towards its normal position.

12. The combination with the deflecting member of a galvanometer, of a member engaging the same when deflected, a member returning said deflecting member towards normal position while in engagement with said second named member, and a circuit including said deflecting member and said second named member while in engagement with each other.

13. The combination with the deflecting member of a galvanometer, of a member engaging the same when deflected, a member returning said deflecting member towards normal position while in engagement with said second named member, and a circuit including said deflecting member and said third named member for the duration of movement of said deflecting member towards its normal position.

14. The combination with the deflecting member of a galvanometer, of a member engaging the same when deflected, and a cam for returning said deflecting member towards its normal position while in engagement with said second member.

15. The combination with a deflecting member, of a member engaging the same when deflected, a cam for returning said deflecting member towards its normal position while in engagement with said second member, and an electric circuit controlled by the contact between said cam and said deflecting member.

16. The combination with a deflecting member, of a member periodically moved toward said deflecting member and engaging the same when deflected, and a member for returning said deflecting member towards its normal position while in engagement with said second named member.

17. The combination with a deflecting member, of a member periodically moved toward said deflecting member and engaging the same when deflected, a member for returning said deflecting member towards its normal position while in engagement with said second named member, an electric circuit controlled by said deflecting member in engagement with said second named member, and independent means for opening said circuit before separation of said deflecting member from said second named member.

18. The combination with a deflecting member, of a member periodically moved toward said deflecting member and engaging the same when deflected, a member for returning said deflecting member towards its normal position while in engagement with said second named member, an electric circuit controlled by said deflecting member in engagement with said member which returns it toward normal position, and independent means for interrupting said circuit prior to disengagement of said deflecting member from said member which returns it towards normal position.

19. The combination with a deflecting member, of a member frictionally engaging the same when deflected, a member for returning said deflecting member toward normal position while in engagement with said second named member, an electric circuit controlled by said deflecting member while in engagement with said third named member, and independent means for interrupting said circuit prior to disengagement of said third member from said deflecting member.

20. The combination with the deflecting member of a galvanometer, of members clamping said deflecting member between them, and a member for moving said deflecting member while clamped between said clamping members.

21. The combination with the deflecting member of a galvanometer, of members clamping said deflecting member between them, a member for moving said deflecting member while clamped between said clamping members, and an electric circuit, the contact between said deflecting member and at least one of said clamping members included in said circuit.

22. The combination with a deflecting member, of members clamping said deflecting member between them, a member for moving said deflecting member while clamped between said clamping members, and an electric circuit, the contact between said deflecting member and said member which moves it while clamped controlling said circuit.

23. The combination with a deflecting member, of a clamping member, a second clamping member periodically clamping said deflecting member between itself and said first named clamping member and means for moving said deflecting member while clamped between said members.

24. The combination with a deflecting member, of a clamping member, a second clamping member periodically operated and clamping said deflecting member when deflected against said first named clamping member, and a member for moving said deflecting member toward its normal position while clamped between said members.

25. The combination with a deflecting member, of a clamping member, a second clamping member periodically operated and clamping said deflecting member when deflected against said first named clamping member, and a cam for returning said deflecting member toward its normal position while clamped between said members.

26. The combination with a deflecting member, of a clamping member, a second clamping member periodically operated and clamping said deflecting member when deflected against said first named clamping member, a cam for returning said deflecting member toward its normal position while clamped between said members, and an electric circuit controlled by the contact between said cam and said deflecting member.

27. The combination with a deflecting member, of a clamping member, a second clamping member periodically operated and clamping said deflecting member when deflected against said first named clamping member, a cam for returning said deflecting member toward its normal position while clamped between said members, an electric circuit controlled by the contact between said cam and said deflecting member, and means for independently breaking said circuit.

28. The combination with a galvanometer provided with a movable pointer, of members for clamping the pointer between them, a member for moving the pointer while clamped between the said clamping members, and an electric circuit, the contact between the pointer and at least one of the clamping members being included in the said circuit.

29. The combination with a galvanometer provided with a movable pointer, of a member frictionally engaging the pointer when in one position, a member for moving the pointer toward another position while in engagement with the said frictional member, an electric circuit controlled by the pointer while in engagement with the second named member, and independent means for interrupting the said circuit prior to dis-engagement of the pointer from the last named member.

30. The combination with a galvanometer pointer, of members for clamping the pointer between them, a member for moving the pointer while clamped, and an electric circuit, the contact between the pointer and the member which moves it while clamped controlling said circuit.

31. The combination with an electrically controlled member, of means for periodically frictionally engaging the said member, and means for moving said member while it is frictionally engaged.

32. The combination with a movable indicating member, of means for periodically frictionally engaging such member, and means for engaging such member when it occupies one position and moving it against the frictional force to another position.

33. The combination with the movable member of a galvanometer, of holding means for frictionally engaging the said member when deflected from its normal position, and means for returning the said movable member to its normal position against the friction of the said holding means.

34. The combination with the movable member of a galvanometer, of holding means for frictionally engaging the said member when in one position, means for returning the movable member to normal position against the friction of the holding means, an electric circuit controlled by the said movable member, and independent means for interrupting the circuit prior to the disengagement of the said movable member from the means which moves it against the frictional holding force.

In testimony whereof I have hereunto affixed my signature this 10th day of November, 1920.

LEO BEHR.